United States Patent
Suda et al.

[11] Patent Number: 5,166,784
[45] Date of Patent: Nov. 24, 1992

[54] ORIGINAL READING APPARATUS, HAVING A FILTER, FOR READING A COLOR ORIGINAL

[75] Inventors: Kenichi Suda; Nobuo Matsuoka, both of Yokohama; Shizuo Hasegawa, Tokyo, all of Japan

[73] Assignee: Canon Kabushiki Kaisha, Tokyo, Japan

[21] Appl. No.: 628,942

[22] Filed: Dec. 14, 1990

Related U.S. Application Data

[63] Continuation of Ser. No. 333,808, Apr. 6, 1989, abandoned, which is a continuation of Ser. No. 922,309, Oct. 23, 1986, abandoned.

[30] Foreign Application Priority Data

Oct. 25, 1985 [JP] Japan ................................. 60-238903
Oct. 25, 1985 [JP] Japan ................................. 60-238904
Oct. 25, 1985 [JP] Japan ................................. 60-238905

[51] Int. Cl.$^5$ ............................................. H04N 1/46
[52] U.S. Cl. ........................................ 358/75; 358/80
[58] Field of Search ............... 358/75, 80, 475, 494; 355/35, 37, 69, 70

[56] References Cited

U.S. PATENT DOCUMENTS

| | | | |
|---|---|---|---|
| 4,016,597 | 4/1977 | Dillon et al. | 358/41 |
| 4,437,111 | 3/1984 | Inai et al. | 358/44 |
| 4,481,594 | 11/1984 | Staggs et al. | 364/521 |
| 4,499,487 | 2/1985 | Takayama et al. | 358/41 |
| 4,593,312 | 6/1986 | Yamasaki | 358/909 |
| 4,667,227 | 5/1987 | Ikeda | 358/75 |
| 4,670,779 | 6/1987 | Nagano | 358/75 |
| 4,677,489 | 6/1987 | Nishimura et al. | 358/213.13 |
| 4,679,073 | 7/1987 | Hayashi | 358/80 |
| 4,688,085 | 8/1987 | Imaide | 358/44 |
| 4,697,038 | 7/1987 | Bantz et al. | 340/721 |
| 4,937,616 | 6/1990 | Maeda et al. | 358/37 |
| 4,939,537 | 7/1990 | Masuda et al. | 358/35 |

FOREIGN PATENT DOCUMENTS 238785 10/1988 Japan.

Primary Examiner—James J. Groody
Assistant Examiner—Kim Yen Vu
Attorney, Agent, or Firm—Fitzpatrick, Cella, Harper & Scinto

[57] ABSTRACT

A color original reading apparatus includes a filter having a long-wavelength invisible radiation absorption filter and a long-wavelength invisible radiation reflection filter, or includes a spectral distribution correction filter arranged in an optical path from an original illumination light source to a color image sensor via an original.

25 Claims, 8 Drawing Sheets

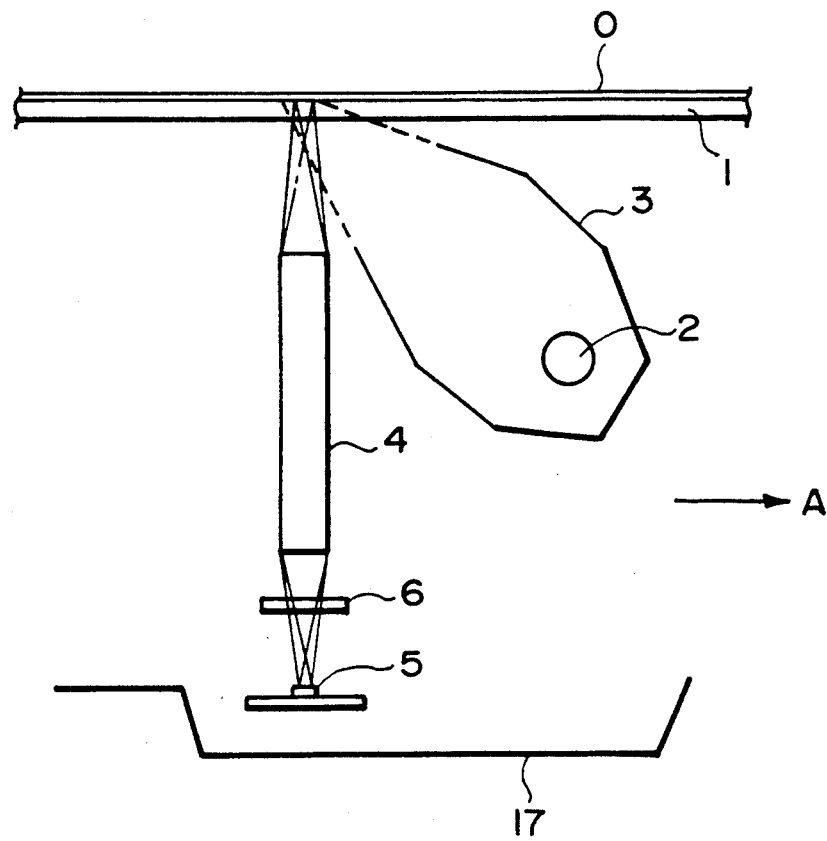
F I G. 1
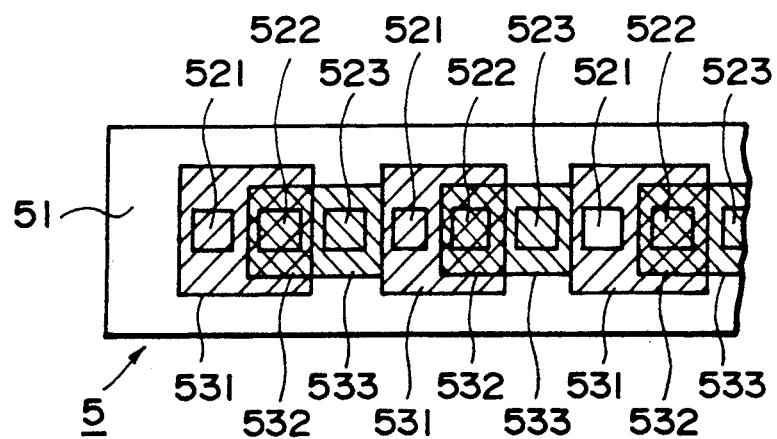
F I G. 2

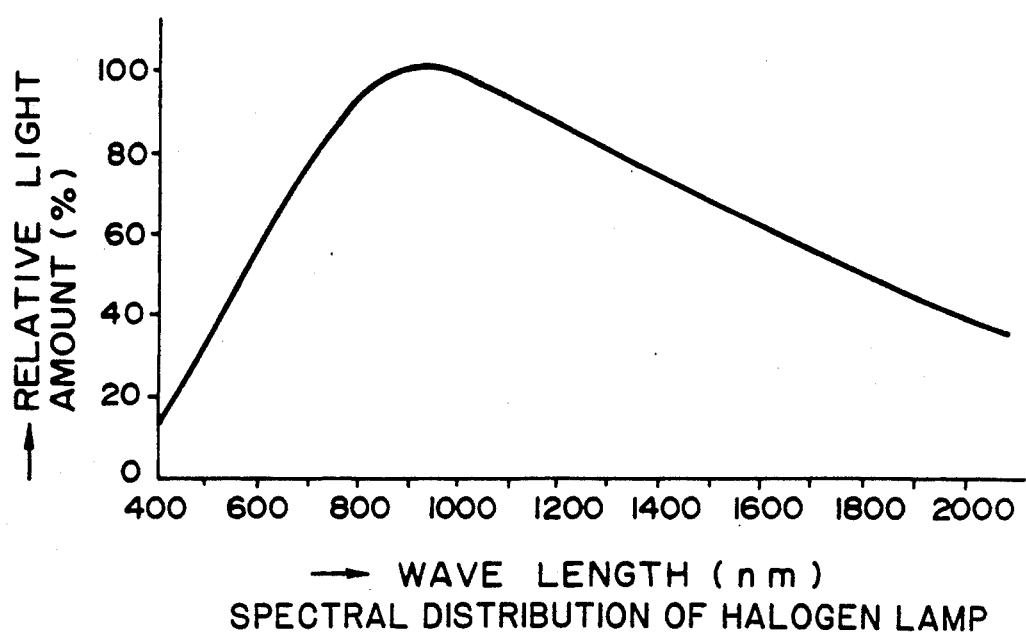
SPECTRAL DISTRIBUTION OF HALOGEN LAMP
F I G. 3
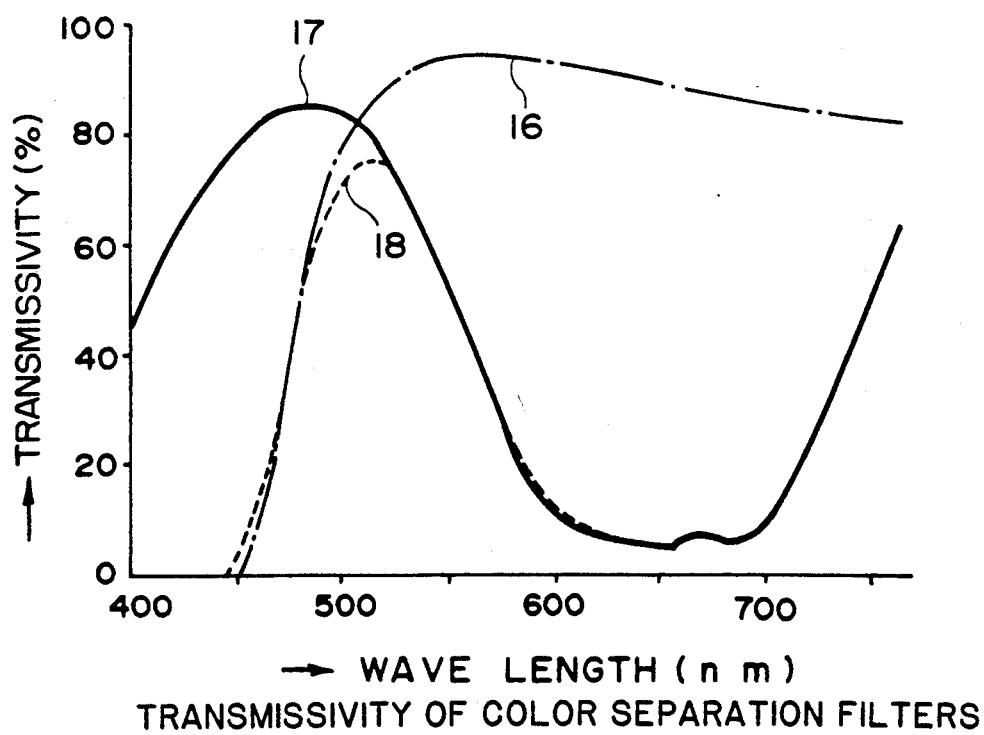
TRANSMISSIVITY OF COLOR SEPARATION FILTERS
F I G. 4

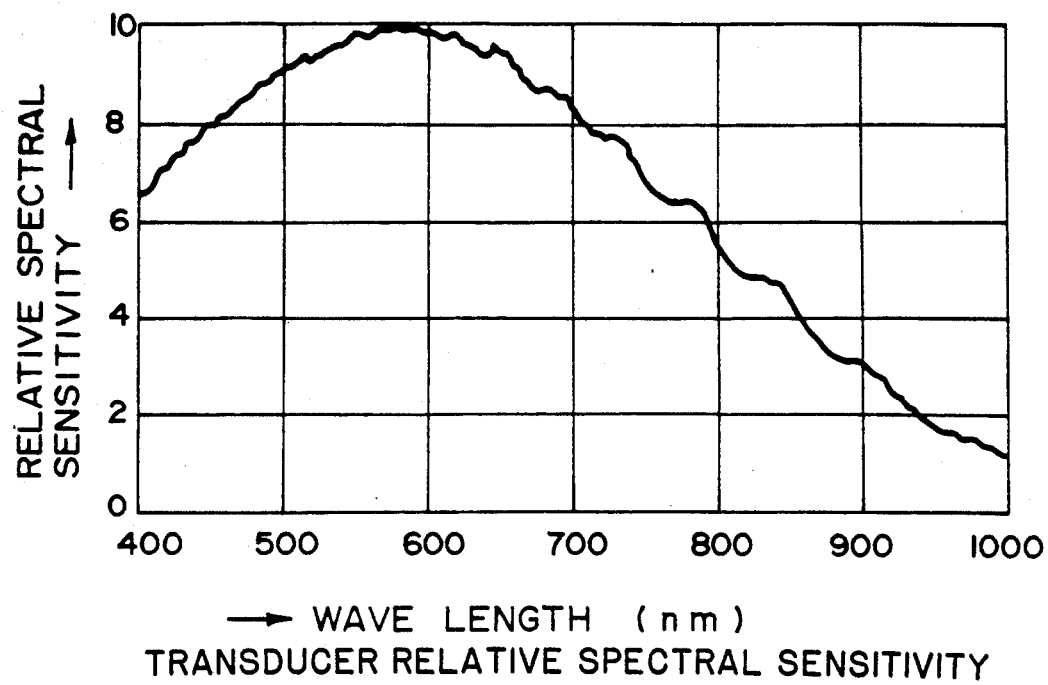
TRANSDUCER RELATIVE SPECTRAL SENSITIVITY
F I G. 5
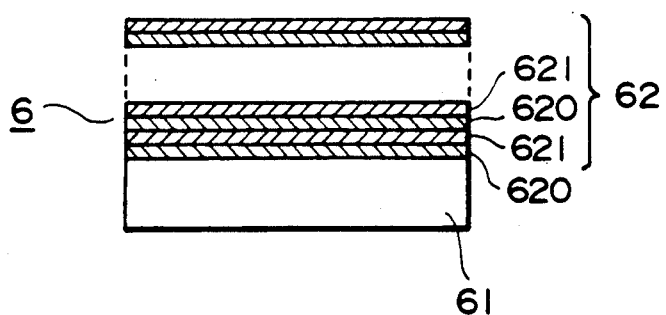
F I G. 6

TRANSMISSIVITY OF LONG-WAVELENGTH
RADIATION REFLECTING FILTER

TRANSMISSIVITY OF LONG-WAVELENGTH
RADIATION ABSORBING FILTER

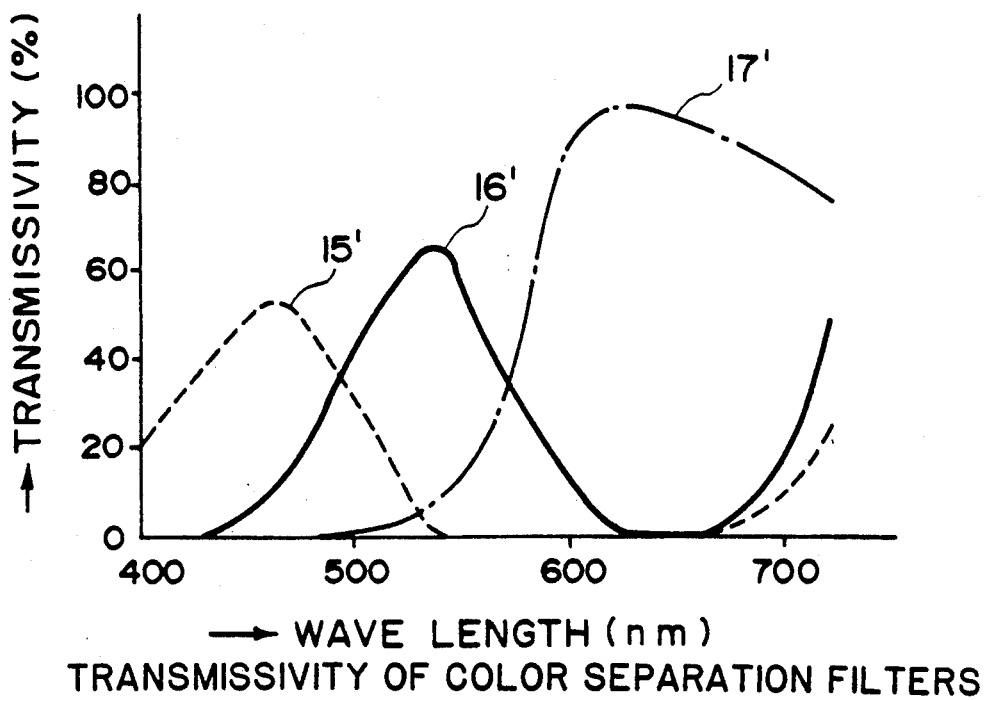
TRANSMISSIVITY OF COLOR SEPARATION FILTERS
F I G. 10
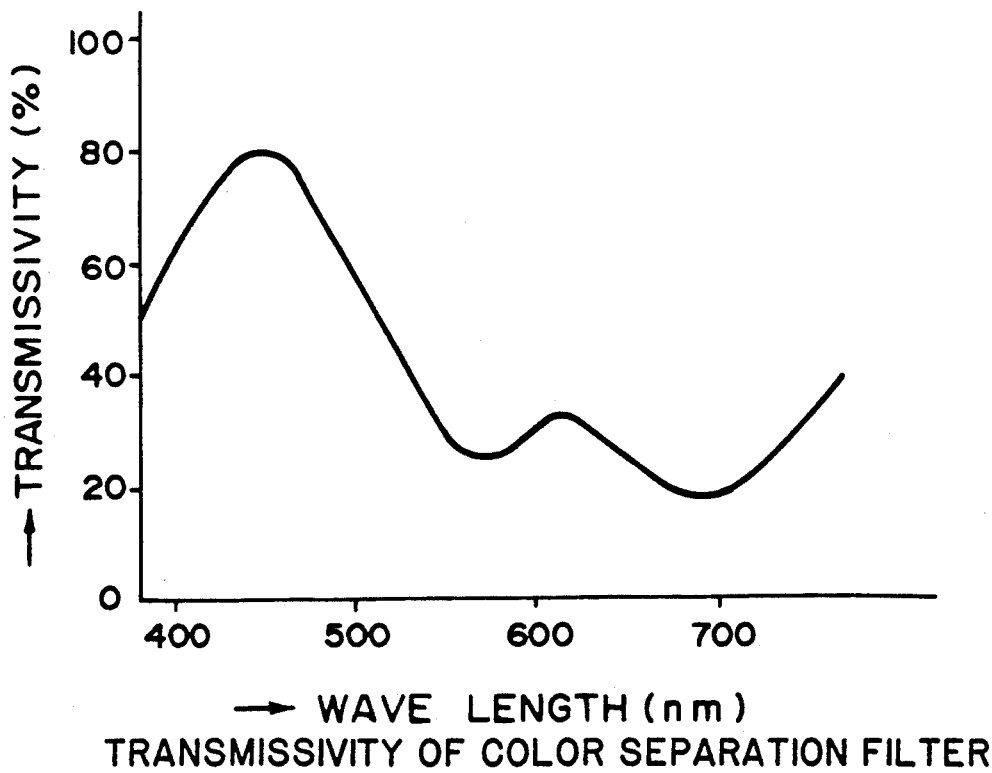
TRANSMISSIVITY OF COLOR SEPARATION FILTER
F I G. 12

ORIGINAL READING APPARATUS, HAVING A FILTER, FOR READING A COLOR ORIGINAL

This application is a continuation of application Ser. No. 07/333,808 filed Apr. 6, 1989 which is a continuation of, now abandoned, application Ser. No. 06/922,309 filed Oct. 23, 1986.

BACKGROUND OF THE INVENTION

1. Field of the Invention

The present invention relates to an original reading apparatus for converting original information into an electrical signal and, more particularly, to an apparatus for reading a color original.

2. Related Background Art

A conventional apparatus is known wherein a small color separation filter for a plurality of colors is formed on a light-receiving surface of a solid-state image sensor such as a CCD having a plurality of photoelectric transducer elements. Image signals corresponding to the respective color components and generated by such an original reading apparatus must represent color separation images with good reproducibility. However, if such image signals are used to reproduce a color image in practice (by an electrophotographic system, an inkjet system, or a thermal transfer system), the hues of the reproduced color image tend to be often different from those of the original color image. In other words, reproducibility of the image signals representing the original hue is poor.

Extensive studies on poor reproducibility have been made, and the following facts are found.

Each photoelectric transducer element of the solid-state color image sensor has good spectral sensitivity for visible radiation as well as invisible light having a long wavelength. A color separation filter of the solid-state color image sensor has a high transmissivity for the visible radiation as well as invisible light having a long wavelength. If an original illumination radiation source emits both visible light and invisible light having a long wavelength, the sensor detects both visible and invisible beams and generates an output representing the intensity of a mixture of the visible and invisible beams. The component corresponding to the visible beam cannot be distinguished from the component corresponding to the invisible beam according to this output. Therefore, the level of the output is different from that of a desired output signal corresponding to only the intensity of the visible beam. In this manner, the sensor detects the invisible light component and outputs the visible light component signal including the invisible radiation component. Therefore, the reproduced color image has different hues from those of the original color image.

SUMMARY OF THE INVENTION

According to an aspect of the present invention, a filter means for removing invisible radiation having a long wavelength is used in addition to the color separation filter. The long-wavelength invisible radiation filter means has a long-wavelength invisible radiation absorption filter portion and a long-wavelength invisible radiation reflecting filter portion, and thus a signal for accurate reproduction of the hues of the original can be formed.

According to another aspect of the present invention, a spectral distribution correction filter means separate from the color separation filter in the color image sensor is used.

BRIEF DESCRIPTION OF THE DRAWINGS

FIG. 1 is a schematic diagram of an original reading apparatus according to an embodiment of the present invention;

FIG. 2 is a schematic plan view of a color image sensor in the original reading apparatus of FIG. 1;

FIG. 3 is a graph showing the spectral distribution of the light emitted from a halogen lamp;

FIG. 4 is a graph showing the transmissivity of a color separation filter in the color image sensor in FIG. 2;

FIG. 5 is a graph showing the spectral sensitivity of a photoelectric transducer element in the color image sensor in FIG. 2;

FIG. 6 is a sectional view of a long-wavelength invisible radiation removal filter in FIG. 1;

FIG. 10 is a graph showing the transmissivity of another color separation filter which may be used in the color image sensor;

FIG. 12 is a graph showing the transmissivity of the spectral distribution correction filter used in the apparatus of FIG. 11;

DESCRIPTION OF THE PREFERRED EMBODIMENTS

Figure 7:
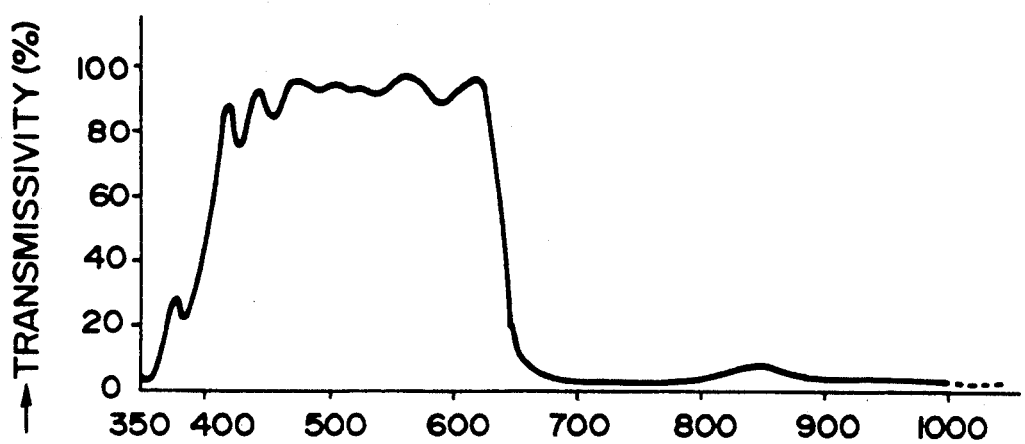
FIG. 7 is a graph showing the transmissivity of a long-wavelength invisible radiation reflecting filter in the filter of FIG. 6.

FIG. 1 shows an original reading apparatus according to an embodiment of the present invention. Referring to FIG. 1, a color original 0 is placed on an original table 1. An original illumination lamp 2 emits light, and the light is reflected by a reflecting mirror 3 so as to direct the reflected light toward the original 0. The reflecting mirror 3 prevents radiation heat of the lamp 2 from being directed toward an image sensor 5 and a filter 6. The lamp 2 may be a fluorescent lamp of, e.g., a daylight color. The fluorescent lamp generally has a relatively low light emission amount and is not suitable for high-speed reading. The spectral characteristics of the fluorescent lamp represent line spectra, and the spectral width upon color separation is narrow, thus preventing high-speed reading. It is therefore difficult to obtain an image signal representing the accurate original hue. The lamp 2 therefore preferably comprises a lamp having a large light emission amount and a continuous spectral distribution such as is exemplified by a halogen lamp. The halogen lamp has a continuous spectral distribution of light emission and a large light emission amount, as shown in FIG. 3. However, as shown in FIG. 3, the halogen lamp emits large amounts of near-infrared and infrared rays as long-wavelength invisible radiation. Therefore, a large amount of these long-wavelength invisible radiation components are included in light reflected by the original.

A focusing optical system 4 focuses a light image of the original 0 onto a solid-state color image sensor 5. The focusing optical system 4 comprises an array of focusing elements having a short focal length and a small diameter, such as distributed index lenses SELFOC (tradename) available from Nippon Sheet Glass Co., Ltd. or such as bar lenses.

As shown in FIG. 2, in the solid-state color image sensor 5, small photoelectric transducer elements 521, 522, and 523 are arranged on a substrate 51 in the light-receiving portion along one direction (i.e., the main scanning direction). Small color separation filters 531, 532, and 533 are adhered onto the light-receiving portion. A cyan (c) component passes through each filter 531; green (g), through each filter 532; and yellow (y), through each filter 533. In this embodiment, the filter 531 has the spectral transmissivity characteristics represented by a curve 17 in FIG. 4; the filter 532, by a curve 18; and the filter 533, by a curve 16. Each photoelectric transducer element 521 receives the c component, each element 522. receives the g component, and each element 523 receives the y component.

The color separation filters 521, 522, and 523 are adhered to the sensor 5 by dyeing its light-receiving portion. Therefore, the respective photoelectric transducer elements are also dyed. More specifically, the filter 532 is formed by overlying the dyed filters 531 and 533. As shown in FIG. 4, the spectral transmissivity of the filter 532 is the product of the transmissivity curves 16 and 17 of the filters 531 and 532. However, the filter 532 may be formed by using the corresponding dye. The color separation filters may be formed on the light-receiving portion of the sensor 5 not by dyeing but by coating. The adjacent photoelectric transducer elements in FIG. 2 have color separation filters of different colors. This is because one photosensitive transducer element corresponds to one pixel in this embodiment. If one pixel corresponds to a plurality of photoelectric transducer elements, e.g., two elements, the adjacent photoelectric transducer elements constituting one pixel have color separation filters of the same color. In this case, the colors of the color separation filters are changed for every plurality of photosensitive transducer elements.

If CCDs are used as the sensor, a plurality of CCDs are aligned in a direction (the main scanning direction) perpendicular to the surface of FIG. 1 to constitute a linear CCD image sensor (a so-called contact type CCD image sensor) fixed on a single support. Alternatively, a monolithic linear image sensor (the so-called contact type CCD image sensor) having a large number of photoelectric transducer elements may be formed on a single elongated substrate. The linear CCD image sensor having a plurality of CCDs arranged as described above is used in the embodiment of FIG. 1. The relative spectral sensitivity of each photoelectric transducer element of the sensor is shown in FIG. 5.

As shown in FIG. 4, the color separation filters 531, 532, and 533 of the solid-state color image sensor 5 have a high transmissivity even in the wavelength range exceeding 700 nm. In other words, the color separation filters have a high transmissivity for long-wavelength invisible radiation including near-infrared and infrared radiation components beyond human hue discrimination capability. As shown in FIG. 5, the photoelectric transducer elements 521, 522, and 523 of the solid-state color image sensor 5 have sensitivity limitation components having wavelengths up to about 1,000 nm. The transducer elements 521, 522, and 523 therefore have considerably high sensitivity for the near-infrared and infrared components as long-wavelength invisible components. The halogen lamp used as the lamp 2 emits large amounts of the near-infrared and infrared components, as shown in FIG. 3. Therefore, the photosensitive transducer elements 521 detect the cyan component as well as the near-infrared and infrared components of the light emitted from the lamp 2 and reflected by the original 0. Thus, the output from the transducer element 521 represents not only the light amount of the cyan component but a mixture of amounts of the cyan, near-infrared radiation, and infrared components. Similarly, the elements 522 and 523 generate outputs which represent not only the light amounts of green and yellow components but represent the radiation amounts including near-infrared and infrared noise components. However, the noise components cannot be discriminated as outputs corresponding to the cyan, green, and yellow light amounts. For this reason, a color image signal formed by a conventional original reading apparatus does not accurately correspond to the hues of the original (i.e., the hue sensed by the human eye).

In the embodiment of FIG. 1, the filter 6 for removing the near-infrared and infrared components as the long-wavelength invisible radiation is arranged in an optical path. The detailed construction of the filter 6 is illustrated in FIG. 6. Referring to FIG. 6, a thin optical film 62 for reflecting near-infrared rays is deposited on a heat wave absorption glass substrate, which is an infrared radiation absorption filter, 61 to constitute an integral body of the infrared radiation absorption filter 61 and the near-infrared light reflection filter 62.

Figure 8:
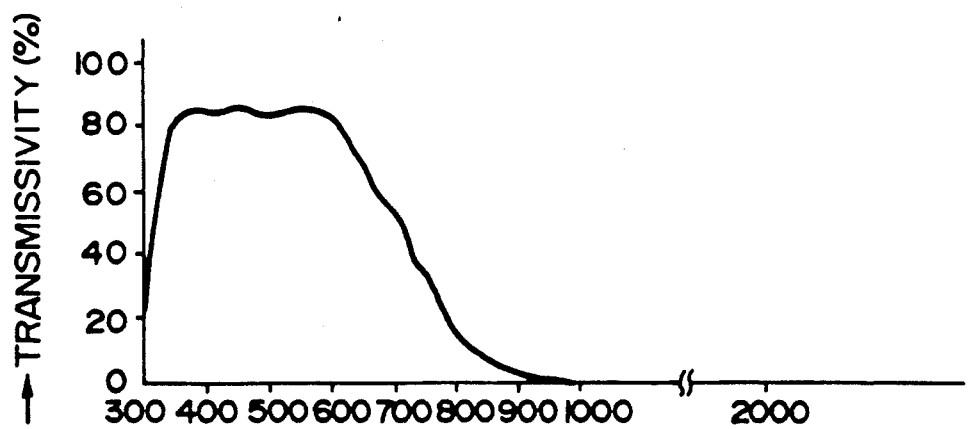
FIG. 8 is a graph showing the transmissivity of a long-wavelength invisible radiation absorbing filter in the filter of FIG. 6.

In this embodiment, phosphate ($P_2O_5$) glass melted with ferrous oxide (FeO) is used for the filter 61. The filter 62 has a multilayer structure obtained by alternately stacking titanium oxide films 620 and silicon oxide films 621. The filter 62 is thus a thin optical film. This film is not transparent to human visual sensitivity and reflects and removes the near-infrared rays of 700 nm or more which do not contribute to hue discrimination. As shown in FIG. 7, the transmissivity of the near-infrared light reflection filter 62 is slightly increased at about 850 nm. At the wavelength of about 850 nm, the spectral distribution of light emitted from the halogen lamp 2 and reflected by the original 0 has substantially a peak. For this reason, the light components of about 850 nm cannot be sufficiently blocked by only the filter 62, and the signal representing the accurate hues of the original cannot be obtained. In addition to the filter 62, the infrared light absorption filter 61 having the transmissivity characteristics shown in FIG. 8 is used to completely shield the sensor 5 from the near-infrared and infrared rays. In other words, the infrared light absorption filter having the characteristics in FIG. 8 has considerably high transmissivities for the light components of about 700 nm to 900 nm which are beyond the hue discrimination capability. The halogen lamp 2 emits large amounts of the light components of about 700 nm to 900 nm. If only the filter 61 is used, these long-wavelength components cannot be sufficiently blocked by the filter 61 and reach the sensor 5. In this manner, the image signal representing the accurate hues of the original cannot be produced. Therefore, the filter 61 is combined with the filter 62 having characteristics (FIG. 7) for eliminating the near-infrared rays of 700 nm or longer (these rays are beyond the human hue discrimination capability). Then, the sensor 5 is substantially shielded from the long-wavelength invisible light components.

In the embodiment of FIG. 1, the near-infrared light reflection filter and the infrared light absorption filter are integrally formed by using a single glass plate. With this construction, the near-infrared and infrared light removal filter means has a small thickness and can be easily inserted in a short optical path between the array 4 and the sensor 5. However, the near-infrared light reflection filter 62 may be arranged separately from the infrared light absorption filter 61.

By using the invisible light elimination filter 6, the noise components corresponding to the near-infrared and infrared rays which are beyond the human hue discrimination capability can be removed from the outputs of the photoelectric transducer elements 521, 522, and 523. Therefore, a color image signal representing the accurate hues of the original can be produced.

Figure 9:
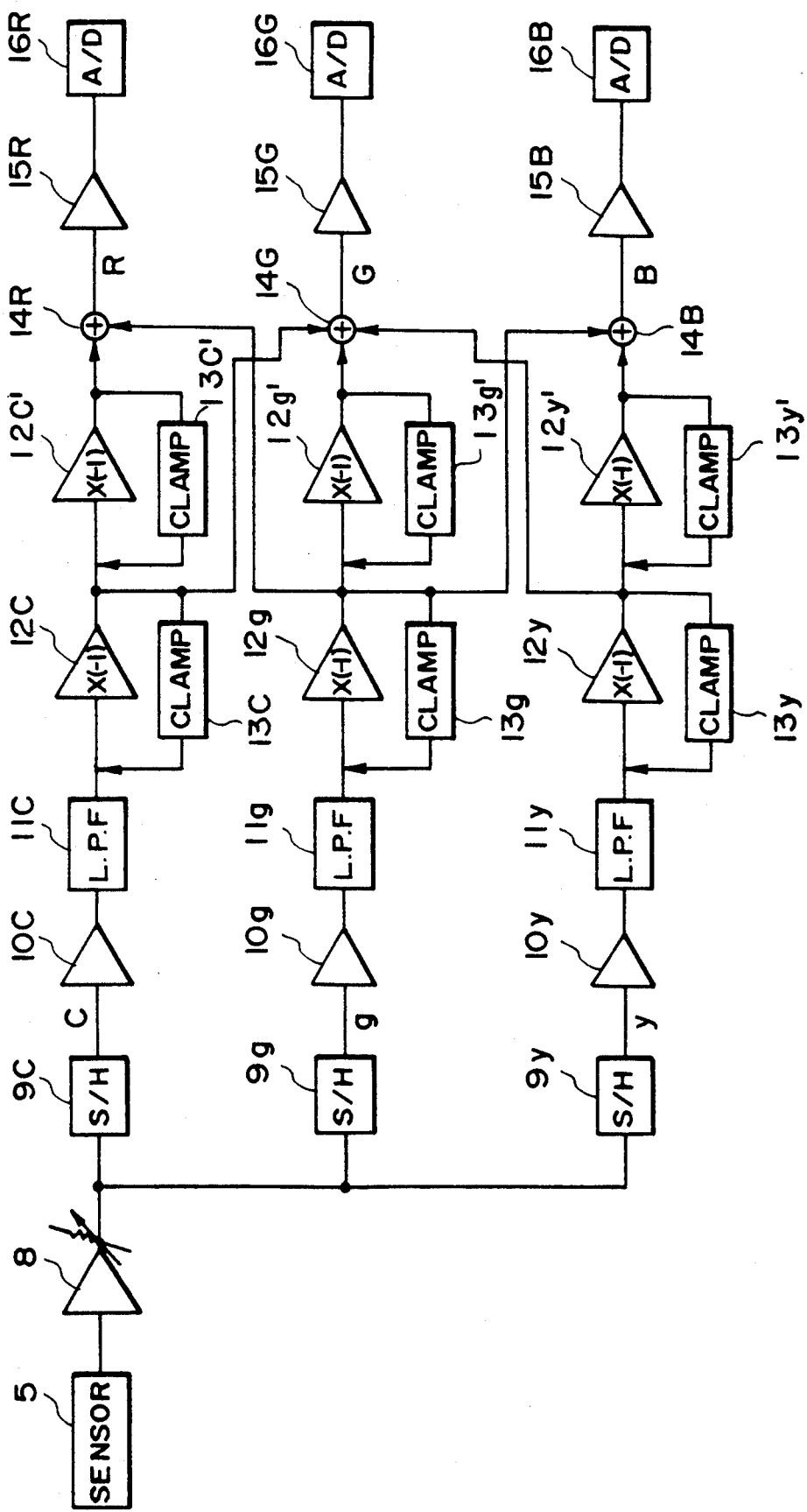
FIG. 9 is a block diagram of a signal processing circuit for processing an image signal from the image sensor.

An output from each photoelectric transducer element in the sensor 5 is processed by a circuit in FIG. 9. The output is converted into an image signal. More specifically, the outputs from the photoelectric transducer elements in the sensor 5 are extracted along the main scanning directions and are commonly applied to a variable amplifier 8. The output levels are controlled by the variable amplifier 8. A serial output signal from the sensor 5, i.e., a serial output signal from the amplifier 8 is a composite signal consisting of a signal (i.e., a c signal) corresponding to the outputs from the elements 521, a signal (i.e., a g signal) corresponding to the outputs from the elements 522, and a signal (i.e., a y signal) corresponding to the outputs from the elements 523. A sample/hold circuit 9c separates the c signal form the composite signal. Similarly, a sample/hold circuit 9g separates the g signal from the composite signal, and a sample/hold circuit 9y separates the y signal therefrom. The components affixed by reference symbols c, g, and y are circuits for respectively processing the c, g, and y signals.

The signals separated by the corresponding sample/hold circuits are amplified by amplifiers 10c, 10g, and 10y to identical levels. The amplifiers 10c 10g, and 10y can finely adjust the gains of the inputs. High-frequency noise components of the amplified image signals are then removed by low-pass filters 11c, 11g, and 11y.

The c signal is the one corresponding to the complementary color of red, and the y signal is the one corresponding to the complementary color of blue. As is also apparent from the spectral distribution (FIG. 3) of the radiation emitted from the lamp 2, the transmissivity characteristic curves (FIG. 4) of the respective color separation filters, and the spectral sensitivity characteristic curve (FIG. 5) of the photoelectric transducer element, the c, g and y signals are not ideal signals obtained by using light components having flat spectral distributions and photoelectric transducer elements having flat spectral sensitivity. In order to obtain image signals accurately corresponding to the three primary colors, i.e., red (R), green (G), and blue (B), the c, g, and y signals are preferably processed on the basis of the corresponding spectral transmissivity and spectral sensitivity characteristics as follows:

$$R = c - A_1 g \quad (1)$$

$$G = g - A_2 c - A_3 y \quad (2)$$

$$B = y - A_4 g \quad (3)$$

where $A_1$ to $A_4$ are coefficients determined by the spectral distribution of the light emitted from the lamp 2 and reflected by the original, the spectral transmissivity distribution of the color separation filters used in the solid-state color image sensor 5, and the spectral sensitivity of the photoelectric transducer elements. In an apparatus having different reflected radiation spectral distributions, different spectral transmissivity distributions, and different spectral sensitivities, the corresponding different coefficients are determined. If the colors of the color separation filters are different from those used in this embodiment, different equations are established. It is essential to employ equations for providing signals accurately reproducing the three primary colors by using the output signals from the photoelectric transducer elements of the corresponding colors.

In order to perform the above calculations, the c, g, and y signals are sequentially supplied to inverting amplifiers 12c, 12g, and 12y and inverting amplifiers 12c'. Clamp circuits 13c, 13g, and 13y and clamp circuits 13c', 13g', and 13y' clamp the signals to predetermined levels. An arithmetic circuit 14R calculates equation (1) and receives the signals from the amplifiers 12c' and 12g. An arithmetic circuit 14G calculates equation (2) and receives the signals from the amplifiers 12g', 12c, and 12y. An arithmetic circuit 14B calculates equation (3) and receives the signals from the amplifiers 12y' and 12g. The arithmetic circuits 14R, 14G, and 14B respectively generate a signal (i.e., an R signal) corresponding to red, a signal (i.e., a G signal) corresponding to green, and a signal (i.e., a B signal) corresponding to blue. The R, G, and B signals are amplified by amplifiers 15R, 15G, and 15B, respectively. The amplified signals are converted into digital signals by A/D analog-to-digital converters 16R, 16G, and 16B, respectively. These digital signals are sent as the image signals to the image reproduction apparatus. In the reproduction apparatus, a red image is formed by using the output image signal from the converter 16R. Similarly, a green image is formed by using the output image signal from the converter 16G, and a blue image is formed by using the output image signal from the converter 16B. These red, green, and blue images overlap to form a multicolor image. The image reproduction apparatus uses a laser beam driven by the image signals, a light-emitting diode array, or a liquid crystal shutter array to expose a photosensitive body with light, thereby forming a latent image. The latent image on the photosensitive body is developed by toners of three colors. Alternatively, an ink-jet head or thermal head is driven by the image signals to form a multicolor image. Any type of image reproduction apparatus may be used, and a detailed description thereof will be omitted.

The filter 6 is preferably arranged in the optical path between the array 4 and the sensor 5, as shown in FIG. 1 since the filter 6 can be located away from the lamp 2 in the optical path, thereby minimizing degradation of the filter. In addition, the width of the filter can be preferably minimized. However, the filter may be arranged in the optical path between the lamp 2 and the original 0 or between the original 0 and the array 4.

The color separation filters 531, 532, and 533 formed on the solid-state color image sensor 5 are respectively cyan, green, and yellow filters. However, red, green, and blue filters having the spectral transmissivities in FIG. 10 may be respectively used in place of the cyan, green, and yellow filters. In this case, outputs from the photosensitive transducer elements corresponding to the respective colors of the color separation filters may be processed by the same means as in the components 12, 12', 13, 13', and 14 (the corresponding suffix is omitted) of FIG. 9. It is desirable to form image signals accurately representing the three primary colors of the original. For example, a red filter transmits not only a pure red beam but also a beam belonging to the green wavelength range. A green filter transmits not only a pure green beam but also beams belonging to the red and blue wavelengths ranges. A blue filter transmits not only pure blue beam but also beams belonging to the green wavelength range. Furthermore, the photosensitive transducer elements have sensitivity for the red, green, and blue wavelength ranges. If a predetermined value of the signal level from the photosensitive transducer element corresponding to the green filter is subtracted from the signals level for the green filter, an image signal representing the accurate red component of the original can be formed. Based upon the above assumptions, the following equations are given:

$$R = r - B_1 g \quad (4)$$

$$G = g - B_2 r - B_3 b \quad (5)$$

$$B = b - B_4 g \quad (6)$$

where r, g, and b are output signals from the photosensitive transducer elements corresponding to the red, green, and blue filters, respectively, and B1 to B4 are coefficients determined by the spectral distribution of the light emitted from the illumination lamp and reflected by the original, the transmissivity characteristics of each color separation filter, and the spectral sensitivity characteristics of the photoelectric transducer elements.

It should be noted that the above calculations may be omitted.

The red, green, and blue color separation filters have spectral transmissivity characteristics corresponding to the near-infrared and infrared rays as long-wavelength invisible radiation. According to this embodiment, since the filter for removing the long-wavelength invisible radiation is included, the R, G, and B signals are substantially free from the noise components corresponding to the invisible near-infrared and infrared rays. Therefore, the color image signal representing the accurate hues of the original can be produced.

The number of colors of the color separation filters is 3 in this embodiment, but may be 4 or more.

The transmissivity of each color separation filter in the color image sensor in this embodiment is substantially zero or very small. A halogen lamp having a small ratio of the near-ultraviolet and ultraviolet rays to the near-infrared and infrared rays in the spectral distribution of the light emitted from the lamp and reflected by the original is used. Therefore, the influence of the near-ultraviolet and ultraviolet rays as the short-wavelength invisible radiation on the signals corresponding to the colors of the color separation filters in the sensor can be neglected, and a near-ultraviolet and ultraviolet radiation elimination filter can be omitted. However, assuming that the photosensitive transducer elements have sufficiently high sensitivity for the near-ultraviolet and ultraviolet rays, that color separation filters have high transmissivities for the near-ultraviolet and ultraviolet rays, and that the ratio of the near-ultraviolet and ultraviolet rays to the near-infrared and infrared rays is high, the noise components corresponding to the near-ultraviolet and ultraviolet rays are mixed in the signals corresponding to the colors of the color separation filters. In order to prevent this, a filter is preferably arranged in an optical path to eliminate the near-ultraviolet and ultraviolet rays as short-wavelength invisible radiation. The filters having the characteristics in FIGS. 7 and 8 can substantially eliminate the near-ultraviolet and ultraviolet rays. More specifically, the filter 62 reflects the near-ultraviolet rays and the filter 61 absorbs the ultraviolet rays.

The means 1 to 7 in FIG. 1 are integrally mounted on a movable carriage 17. In the original read mode, the carriage 17 is moved in a subscanning direction (indicated by arrow A) substantially perpendicular to the longitudinal direction (i.e., the main scanning direction) of the sensor and scans the original. However, the original table 1 or the original 0 itself may be moved in the subscanning direction to read the original.

Figure 11:
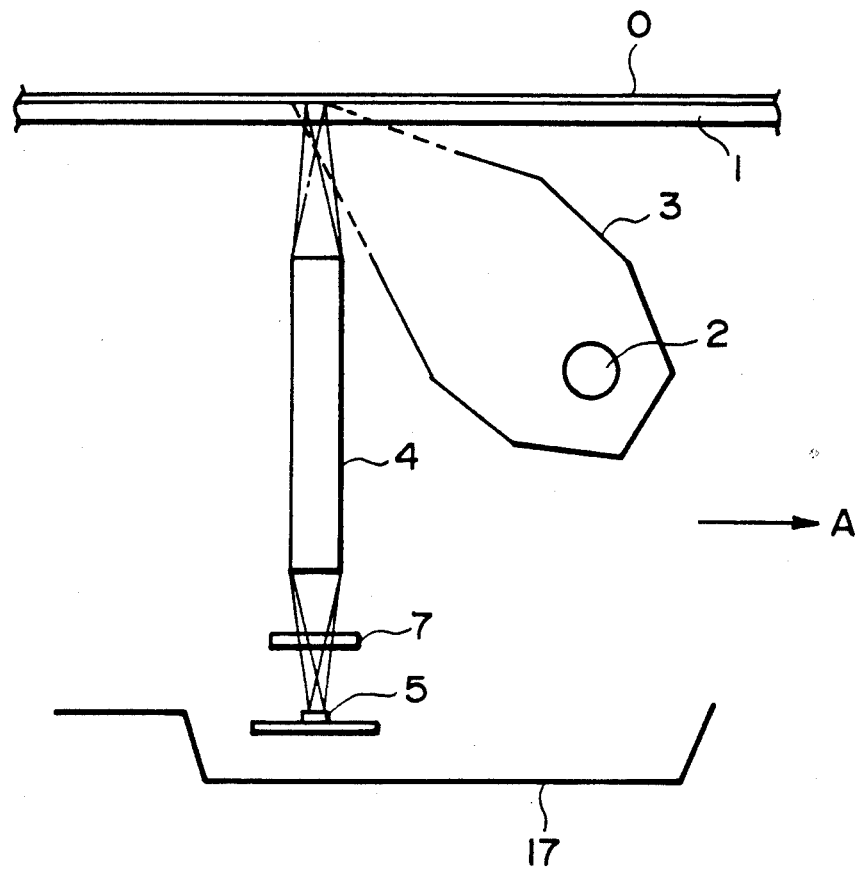
FIG. 11 is a schematic view of an original reading apparatus according to another embodiment of the present invention.

In an original reading apparatus of FIG. 11, a spectral distribution correction filter 7 is used in place of the invisible radiation removal filter 6 in the apparatus of FIG. 1. The spectral distribution correction filter means is used in the apparatus of FIG. 11 for the following reason. The spectral sensitivity of the photosensitive transducer elements in the solid-state color image sensor varies depending on the colors of the predetermined color separation filters. The transmissivities of the color separation filters in the sensor are different from each other according to different colors. Therefore, the spectral sensitivities of the sensor are different from each other according to the visible light components. Therefore, the outputs from the sensor are different from each other according to different visible light components. The levels of the output signals are conventionally adjusted by a plurality of amplifying means having different gains to obtain identical signal levels, thus complicating the circuit arrangement. In the apparatus of FIG. 11, a spectral distribution correction filter means is used to decrease the difference of levels of outputs from the color separation filters in the sensor, as compared with the case wherein such a filter means is not arranged. Therefore, the circuit arrangement can be simplified and the image signals accurately corresponding to the colors of the color separation filter can be produced.

In the apparatus of FIG. 11, a signal processing means obtained by modifying the amplifiers 10c, 10g, and 10y in the circuit of FIG. 9 is used and operated according to the equations described above.

As is apparent from the spectral transmissivity curves of the color separation filters in FIG. 4 and the spectral sensitivity curve of the photosensitive transducer element in FIG. 5, the total spectral sensitivity of the color image sensor which is expressed as the product of the transmissivities and the spectral sensitivity levels varies according to the color components. The spectral distribution of the light emitted from the original illumination lamp is not uniform, as shown in FIG. 3. If white paper having no image is used as an original, the level of an output from the elements 521 corresponding to cyan is considerably lower than that from the elements 522 corresponding to green, and is considerably lower than that from the elements 523 corresponding to yellow. In this case, in the circuit of FIG. 9, after the composite signal from the sensor 5 is separated into the c, g and y signals, they must be input to amplifiers 10c, 10g, and 10y having large gain differences. However, when the amplifiers having large gain differences are used, the circuit arrangement becomes complicated. As shown in FIG. 11, the spectral distribution correction filter 7 is arranged in the optical path. In this embodiment wherein the original illumination lamp having the spectral distribution (FIG. 3) of the light emitted from the lamp, the color separation filters having the transmissivity curves (FIG. 4), and the photoelectric transducers having the spectral sensitivity curve (FIG. 5) are used, the filter having the transmissivity curve in FIG. 12 is used. The filter 7 is a bluish filter and is arranged in the optical path. An output level difference between the photoelectric transducer elements 521 and 522, an output level difference between the photoelectric transducer elements 521 and 523, and hence an output level difference between the photoelectric transducer elements 522 and 523 are reduced as compared with the case wherein the filter 7 is not used. The output differences become substantially zero. Therefore, in the case of FIG. 9, the amplifiers 10c, 10g, and 10y can have an identical arrangement with the gain fine-adjustment function and simplify the overall circuit. The output levels of the amplifiers 10c, 10g, and 10y are substantially the same. With this arrangement, a color image signal representing the accurate hues of the original can be produced. The transmissivity characteristics of the spectral distribution correction filter 7 are determined to minimize the output differences corresponding to the colors of the color separation filters in the sensor according to the transmissivity characteristics of the color separation filters in the solid-state color image sensor and the spectral sensitivity characteristics of the photoelectric transducer elements. The spectral distribution correction filter 7 may be a glass or gelatin filter dyed with phthalocyanine or the like.

The filter 7 is preferably arranged in the optical path between the array 4 and the sensor 5 in FIG. 11 since the filter 7 can then be located away from the lamp 2, thereby minimizing thermal degradation of the filter. At the same time, the filter width can be minimized. However, the filter 7 may be arranged in the optical path between the lamp 2 and the original 0 or between the original 0 and the array 4.

The color separation filters 531, 532, and 533 formed on the solid-state image sensor 5 in the first embodiment are respectively cyan, green, and yellow filters. However, as noted red, green, and blue filters having the transmissivity characteristics in FIG. 10 may be respectively used in place of the cyan, green, and yellow filters. In this case, outputs from the photoelectric transducer elements for different colors in the sensor are preferably processed according to equations (4) to (6) to produce image signals representing the accurate hues of the three primary colors of the original. The transmissivity characteristics of the spectral distribution correction filter 7 are determined by the spectral distribution of the light emitted from the illumination lamp, the transmissivities of the color separation filters, and the spectral sensitivity characteristics of the colors of color separation in the same manner as in the previous embodiment.

If the lamp having the characteristics (FIG. 3), the color separation filters having the characteristics (FIG. 10), and the photoelectric transducer elements having the characteristics (FIG. 5) are used, the spectral distribution correction filter 7 may have the transmissivity characteristics in FIG. 12.

Figure 13:
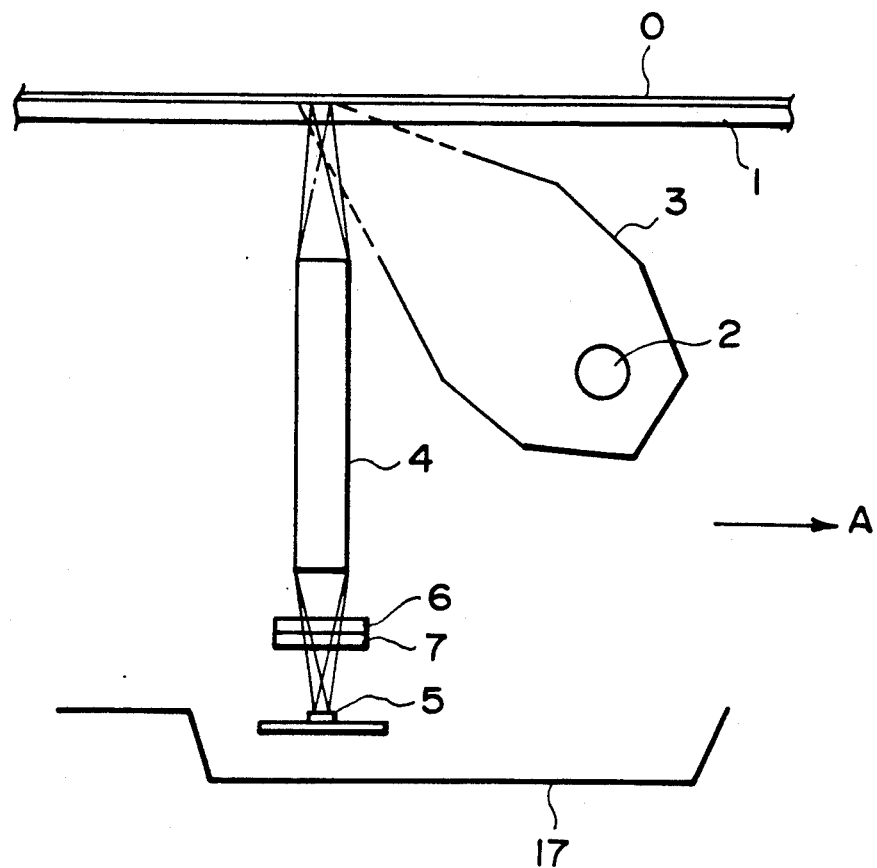
FIG. 13 is a schematic view of an original reading apparatus according to still another embodiment of the present invention.
Figure 14:
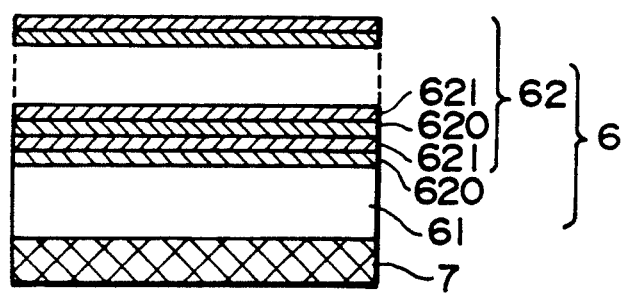
FIG. 14 is a sectional view of a filter used in the apparatus of FIG. 13.

In an apparatus of FIG. 13, both the filters 6 and 7 are used. In this case, identical amplifiers with the gain fine-adjustment function can be used as the amplifiers 10c, 10g, and 10y in the signal processing means in FIG. 9.

In the apparatus of FIG. 13, a dyed glass or gelatin filter can be used as the spectral distribution correction filter 7. The filter 7 may be arranged separately from the filter 6. However, in order to easily mount the filters 6 and 7 in a narrow optical path between the array 4 and the sensor 5, a dye such as phthalocyanine may be coated on a surface of the heat wave absorption glass substrate 61 which is opposite to its surface facing the near-infrared reflecting optical film 62, thereby constituting the filter 7 having transmissivity characteristics in FIG. 12. In this manner, the filters 6 and 7 are integrally formed to achieve a low-profile construction. The light without the near-infrared and infrared rays must be incident on the spectral distribution correction filter 7 so as to prevent the degradation of the filter. The filters 6 and 7 are arranged in the optical path between the array 4 and the sensor 5, as shown in FIG. 13 so that the filters are located away from the lamp 2, thereby preventing thermal degradation of the filters. At the same time, the widths of the filters can be minimized. However, one or both the filters 6 and 7 may be located in the optical path between the lamp 2 and the original 0 or between the original 0 and the array 4.

We claim:

1. An original reading apparatus, including:
light source means for illuminating an original;
color image sensor means for receiving light reflected by the original and outputting signals respectively corresponding to a plurality of types of color information; and
invisible radiation removing filter means, arranged in an optical path from said light source means to said color image sensor means via the original, for removing long-wavelength invisible radiation, said filter means being provided with a long-wavelength invisible radiation absorption filter and a long-wavelength invisible radiation reflection filter.

2. An apparatus according to claim 1, wherein said color image sensor means comprises a plurality of small photoelectric transducer elements and color separation filter means, both of which are formed in a light-receiving portion of said color image sensor means, said color separation filter means being provided with a plurality of types of small filters each having a different color separation characteristic, said photoelectric transducer elements having spectral sensitivity for both visible light and long-wavelength invisible radiation, said color separation filter means having transmissivity characteristics for both the visible light and the long-wavelength invisible radiation.

3. An apparatus according to claim 2, wherein said long-wavelength invisible radiation absorption filter and said long-wavelength invisible radiation reflection filter are integrally formed.

4. An apparatus according to claim 3, wherein said long-wavelength invisible radiation reflection filter is deposited on said long-wavelength invisible light absorption radiation.

5. An apparatus according to claim 2, further comprising a focusing optical system for focusing an image of an original onto said light-receiving portion of said color image sensor means, wherein said light source means comprises a halogen lamp, and said invisible radiation removing filter means is arranged between said color image sensor means and focusing optical system.

6. An original reading apparatus comprising:
light source means for illuminating an original;
color image sensor means for receiving light reflected by the original and producing outputting signals respectively corresponding to a plurality of types of color information, said color image sensor means being provided with small photoelectric transducer elements for producing said output signals and having spectral sensitivity for both visible light and long-wavelength invisible radiation, and with color separation filter means having transmissivity characteristics for both the visible light and the long-wavelength invisible radiation, said color separation filter means being provided with a plurality of types of small color filters each having a different color separation characteristic; and
filter means arranged in an optical path from said light source means to said color image sensor means via the original, said filter means having a long-wavelength invisible radiation removal filter and a spectral distribution correction filter, said spectral distribution correction filter correcting the spectral distribution of visible radiation directed toward said color image sensor means so that the level differences between output signals from said photoelectric transducer elements that correspond to a white original are reduced; and
wherein said long-wavelength invisible radiation removal filter comprises a transparent long-wavelength invisible radiation absorption plate and a thin long-wavelength invisible radiation reflection film formed on said transparent long-wavelength invisible radiation absorption plate.

7. An apparatus according to claim 6, wherein said long-wavelength invisible radiation removal filter and said spectral distribution correction filter are formed integrally.

8. An apparatus according to claim 7, further comprising a focusing optical system for focusing an image of the original onto said color image sensor means, wherein said filter means is arranged between said color image sensor and said focusing optical system.

9. An original reading apparatus, comprising:
a light source for illuminating an original;
a color image sensor for receiving light from the original and for outputting color information signals;
an array of short-focus image-forming elements for image-forming light obtained by irradiating the original by said light source on said color image sensor;
long-wavelength invisible radiation removing means for removing long-wavelength invisible radiation from said light source; and
spectral distribution correcting means for decreasing output level differences corresponding to each of the color information signals from said color image sensor;
wherein said long-wavelength invisible radiation removing means and said spectral distribution correcting means are arranged integrally and are disposed between said array of short-focus image-forming elements and said color image sensor.

10. An original reading apparatus according to claim 9, wherein said spectral distribution correcting means has a transmissivity of wavelength corresponding to each of the color image signals, in which the transmissivity of wavelength corresponding to a blue color of light is greater than the transmissivity of wavelength corresponding to a green color of light, and the transmissivity of wavelength of the green color of light is greater than the transmissivity of the wavelength corresponding to a red color of light.

11. An original reading apparatus according to claim 9, wherein the transmissivity of said spectral distribution correcting means is such that the output level differences from said color image sensor corresponding to blue color, green color and red color of light are substantially equal to zero.

12. An original reading apparatus according to claim 9, wherein said light source is a halogen lamp.

13. An original reading apparatus according to claim 9, wherein said long-wavelength invisible radiation removing means comprises a portion for absorbing infrared and a portion for reflecting near-infrared.

14. An original reading apparatus according to claim 9, wherein said color image sensor comprises a plurality of photoelectric transducer elements for producing said color information signals, said original reading apparatus further including a plurality of amplifiers for amplifying output signals from said photoelectric transducer elements respectively corresponding to the different colors, said amplifiers having an identical arrangement.

15. An original reading apparatus according to claim 13, wherein the portion for absorbing infrared light comprises a plate-like glass, and wherein the portion for reflecting the near-infrared light comprises an optical thin film vaporized onto said glass.

16. An original reading apparatus according to claim 9, wherein said spectral distribution correcting means is provided on a surface of said long-wavelength invisible radiation removing means.

17. An original reading apparatus according to claim 16, wherein said spectral distribution correcting means comprises an optical thin film vaporized onto said large-wavelength invisible radiation removing means.

18. An original reading apparatus, comprising:
a light source for illuminating an original;
a color image sensor for receiving light from the original and for outputting color information signals;
a long-wavelength invisible radiation removing filter for removing long-wavelength invisible radiation from said light source; and
a single spectral distribution correcting filter for decreasing output level differences corresponding to the color information signals from said color information sensor;
wherein said long-wavelength invisible radiation removing filter and said spectral distribution correcting filter are disposed in an optical path of the light from the original irradiated by said light source to said color image sensor and wherein said long-wavelength invisible radiation removing filter is disposed between said light source and said spectral distribution correcting filter in the light path.

19. An original reading apparatus according to claim 18, wherein said long-wavelength invisible radiation removing filter comprises a plate-like glass, and wherein said spectral distribution correcting filter is provided on a surface at a light outputting side of said plate-like glass.

20. An original reading apparatus according to claim 19, when said spectral distribution correcting filter comprises an optical thin film vaporized onto said plate-like glass.

21. An original reading apparatus according to claim 18, wherein said light source comprises a halogen lamp.

22. An original reading apparatus, comprising:
a light source for illuminating an original;
a color image sensor for receiving light from the original and for outputting color information signals;
long-wavelength invisible radiation removing means for removing long-wavelength invisible radiation from said light source; and
spectral distribution correcting means for decreasing output level differences corresponding to each of the color information signals from said color image sensor,
wherein said long-wavelength invisible radiation removing means and said spectral distribution correcting means are arranged integrally.

23. An original reading apparatus according to claim 22, wherein said spectral distribution correcting means is provided on a surface of said long-wavelength invisible radiation removing means.

24. An original reading apparatus according to claim 23, wherein said spectral distribution correcting means comprises an optical thin film vaporized onto said large-wavelength invisible radiation removing means.

25. An original reading apparatus according to claim 23, wherein said color information signals are signals representing blue, green and red.

* * * * *

UNITED STATES PATENT AND TRADEMARK OFFICE
CERTIFICATE OF CORRECTION

PATENT NO. : 5,166,784
DATED : November 24, 1992
INVENTOR(S) : KENICHI SUDA, ET AL.

It is certified that error appears in the above-identified patent and that said Letters Patent is hereby corrected as shown below:

COLUMN 1

Line 36, "visible radiation" should read --visible light--; and "invisible light" should read --invisible radiation--.

Line 39, "visible radiation" should read --visible light--; and "invisible light" should read --invisible radiation--.

Line 40, "radiation" should read --light--.

Line 41, "invisible light" should read --invisible radiation--.

COLUMN 4

Line 13, "light" should read --radiation--.
Line 16, "near-infrared" should read --near-infrared,--.
Line 17, "radiation, and infrared" should read --and infrared radiation--.

COLUMN 5

Line 37, "form" should read --from--.
Line 58, "c ," should read --c,--.

COLUMN 6

Line 23, "12c'." should read --12c', 12g' and 12y'.--.
Line 30, "12y" should read --12y.--.
Line 31, ".An" should read --An--.

UNITED STATES PATENT AND TRADEMARK OFFICE
CERTIFICATE OF CORRECTION

PATENT NO. : 5,166,784
DATED : November 24, 1992
INVENTOR(S) : KENICHI SUDA, ET AL.

It is certified that error appears in the above-identified patent and that said Letters Patent is hereby corrected as shown below:

COLUMN 7

Line 22, "signals" should read --signal--.
    Line 34, "B1 to B4" should read --$B_1$ to $B_4$--.

COLUMN 10

Line 68, "radiation" should read --filter--.

COLUMN 11

Line 12, "outputting" should read --output--.

COLUMN 12

Line 45, "large-" should read --long- --.

COLUMN 14

Line 14, "large-" should read --long- --.

Signed and Sealed this

Twenty-eighth Day of December, 1993

Attest:

BRUCE LEHMAN

*Attesting Officer*    *Commissioner of Patents and Trademarks*